United States Patent
Stemmle et al.

(10) Patent No.: US 10,218,165 B2
(45) Date of Patent: Feb. 26, 2019

(54) TERMINATION FOR A SUPERCONDUCTIVE CABLE

(71) Applicant: NEXANS, Courbevoie (FR)

(72) Inventors: Mark Stemmle, Hannover (DE); Waldemar Pedde, Gehrden (DE); Nicolas Lallouet, Fiennes (FR); Sébastien Delplace, Loon-Plage (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 15/943,135

(22) Filed: Apr. 2, 2018

(65) Prior Publication Data
US 2018/0331529 A1    Nov. 15, 2018

(30) Foreign Application Priority Data

Apr. 7, 2017 (EP) .................................. 17305415

(51) Int. Cl.
| | |
|---|---|
| *H02G 15/34* | (2006.01) |
| *H01R 4/68* | (2006.01) |
| *F17C 3/08* | (2006.01) |
| *H01B 12/16* | (2006.01) |
| *H01B 12/14* | (2006.01) |

(52) U.S. Cl.
CPC ............ *H02G 15/34* (2013.01); *F17C 3/085* (2013.01); *H01B 12/16* (2013.01); *H01R 4/68* (2013.01); *H01B 12/14* (2013.01)

(58) Field of Classification Search
CPC ........ H01B 7/423; H01B 12/16; H01B 12/14; H01B 17/54; H01R 4/68; H02G 15/34; F17C 3/085
See application file for complete search history.

(56) References Cited

U.S. PATENT DOCUMENTS

| | | | | |
|---|---|---|---|---|
| 4,294,504 A | * | 10/1981 | Siewerdt .................. | H01B 9/00 174/103 |
| 7,825,331 B2 | * | 11/2010 | Allais ..................... | H02G 15/34 16/2.1 |
| 2006/0011377 A1 | * | 1/2006 | Schmidt ................... | H01R 4/68 174/125.1 |

FOREIGN PATENT DOCUMENTS

EP    1887671    2/2008

OTHER PUBLICATIONS

Search Report dated Nov. 24, 2017.

* cited by examiner

*Primary Examiner* — Hoa C Nguyen
*Assistant Examiner* — Amol H Patel
(74) *Attorney, Agent, or Firm* — Sofer & Haroun, LLP

(57) ABSTRACT

The invention specifies a termination (1) for a superconducting cable (2) which is arranged in a tubular cryostat, which serves for carrying a coolant, and has at least one electrical conductor. The termination (1) has an inner sheath (3), in which one end of the cable (2) is arranged in a coolant, and an outer sheath (4), wherein the sheaths (3, 4) are composed of electrically insulating material and insulating material is arranged in an existing intermediate space (5) between the inner and the outer sheath. The inner sheath (3) is connected to the cryostat, and the termination (1) is arranged vertically in the assembly position such that a lower part (C) of the inner and the outer sheath (3, 4) is connected to earth and an upper part (A) of the inner and the outer sheath (3, 4) is connected to high-voltage potential in the operating state. At the respective upper end, the inner sheath (3) is closed off by a first bursting disc (3*a*) and the outer sheath (4) is closed off by a second bursting disc (4*a*).

10 Claims, 4 Drawing Sheets

TERMINATION FOR A SUPERCONDUCTIVE CABLE

This application claims the benefit of priority from European Patent Application No. 17 305 415.6, filed on Apr. 7, 2017, the entirety of which is incorporated by reference.

BACKGROUND

Field of the Invention

The invention relates to a termination for a superconducting cable which is arranged in a tubular cryostat, which serves for carrying a coolant, and has at least one electrical conductor, wherein the termination has an inner sheath, in which one end of the cable is arranged in a coolant, and an outer sheath, wherein the sheaths are composed of electrically insulating material and insulating material is arranged in an existing intermediate space between the inner and the outer sheath, wherein the inner sheath is connected to the cryostat. The termination is arranged vertically in the operating state, wherein a lower part of the outer and the inner sheath is connected to earth and an upper part of the sheaths is connected to high-voltage potential. The invention further relates to a method for constructing a termination for a superconducting cable.

Description of Related Art

A superconducting cable, for example for use in high-voltage electrical systems, has one or more electrical conductors which are composed of material which changes over to the superconducting state at sufficiently low temperatures. The at least one conductor can also be composed of a combination of superconducting material and normally conducting material. A plurality of conductors of a superconducting cable are usually arranged concentrically. An outer shield conductor surrounds the one or several conductors of the cable. The shielding conductor can likewise be composed of material which changes over to the superconducting state at sufficiently low temperatures. However, the shielding conductor can also be composed of a combination of superconducting material and normally conducting material or only of normally conducting material. The conductors and the shielding conductor are arranged in a manner separated from one another by an electrical insulating layer in each case. The conductors and the shielding conductor and also the electrical insulation which is located between them are arranged in a thermally insulating sheath which contains a coolant. Suitable coolants are, for example, nitrogen in the liquid state or helium.

The ends of the superconducting cable are each provided with a termination, as described at the outset. The termination allows electrical and thermal transfer from the cooled, superconducting system to a normally conducting system at ambient or room temperature on both sides of a transmission section. A normally conducting system is, for example, an electrical high-voltage supply or power distribution system.

A termination of this kind is described, for example, in EP1617537 B1. The termination has a bushing with an electrical conductor for each conductor of the superconducting cable. The electrical conductor of the bushing is, for example, a connector which is connected to a superconducting conductor at one end and to a normally conducting conductor at the other end.

Terminations of this kind are preferably used vertically. The vertical arrangement is, in particular, a space-saving arrangement in which the end of the termination which is at high-voltage potential is as remote from the ground as possible.

OBJECTS AND SUMMARY

The invention is based on the object of providing a termination for a superconducting cable, which termination is of simple construction and, at the same time, meets all thermal and electrical requirements.

According to the invention, this object is achieved in that, at their respective upper end, the inner sheath of the termination is closed off by a first bursting disc and the outer sheath of the termination is closed off by a second bursting disc.

Owing to the arrangement of the bursting discs at the respectively upper ends of the inner and outer sleeve, the coolant, for example liquid nitrogen, which escapes in the event of possible bursting can be discharged directly to the ambient air and evaporated there. No outflow or exhaust gas lines are required. The construction of the termination is considerably simplified in this way.

The object of the invention is further achieved in that, at their respective upper end, the inner sheath of the termination is closed off by an inner terminating plate and the outer sheath of the termination is closed off by an outer terminating plate, wherein the at least one conductor of the cable is electrically conductively connected to the inner terminating plate and the inner terminating plate is electrically conductively connected to the outer terminating plate.

The termination according to the invention allows particularly simple connection of the superconducting cable to the said termination. Assembly of the termination is therefore simplified and more cost-effective than for known terminations.

In the case of the termination according to the invention, the at least one conductor of the cable can be connected to the inner terminating plate by means of a plug which is fitted to the cable end. The inner terminating plate can be connected to the outer terminating plate by means of a plug or by means of a flexible conductor ribbon.

In the case of the termination according to the invention, the at least one conductor of the cable end can advantageously be electrically conductively connected to a contact element which leads laterally to the outside.

The coolant which is required for cooling the cable end can advantageously be guided from the lower part of the termination which is connected to earth, within the said termination, to the upper part which is at high voltage by means of a cooling pipe which is composed of electrically insulating material. The introduction of the coolant into the cooling pipe at the lower end of the termination, which end is connected to earth, simplifies handling of the said termination and also connection of the said termination to a cooling installation. The introduction of the coolant into the inner sheath at the upper end of the termination prevents thermal layering in the said termination and also the formation of gas bubbles. The cooling pipe can run within the inner sheath and can be arranged concentrically in relation to the said inner sheath, so that the supplied coolant is conveyed upwards in the intermediate space between the inner sheath and the cooling pipe. The cooling pipe can also convey the coolant to the high-voltage potential between the inner sleeve and the outer sleeve. Owing to the cooling pipe running in the interior of the termination, no thermally and electrically insulating supply line outside the termination is required either.

According to a further aspect, the invention relates to a method for constructing a termination for a superconducting cable. A flexible cryostat which is connected to the cable cryostat is fitted over the end of the cable cryostat, initially over the protruding cable end in the horizontal position, wherein the cryostat is composed of two flexible pipes which are arranged concentrically in relation to one another and which are separated from one another by a vacuum-insulated gap. The termination is likewise connected to the cable end and to the cryostat, which is fitted to the said cable end, in the horizontal position. The termination is then moved to the vertical position in the assembled state, wherein the flexible cryostat and the cable which is situated therein are bent.

In the case of the method according to the invention, the termination is connected to the superconducting cable end by means of a highly flexible cryostat. These two construction steps are advantageously carried out in the horizontal position, as a result of which the working steps are substantially simplified in comparison to a vertical construction. After the assembly work is complete, the assembled termination is moved to the vertical position. Owing to the highly flexible cryostat, undesired stresses, which can occur during erection and lead to damage to at the connecting point between the cable cryostat and the termination cryostat, are avoided at the interface between the cable cryostat and the termination. During the erection operation, only the flexible cryostat segment and the superconducting cable which is arranged therein are bent through approximately 90°.

The invention also relates to a connecting cryostat for constructing a termination for a superconducting cable, wherein the connecting cryostat is composed of two flexible pipes which are arranged concentrically in relation to one another and which are separated from one another by a vacuum-insulated gap, the connecting cryostat is fitted over the cable end and is connected to the inner sheath at one end and to the cable cryostat at the other end, and the connecting cryostat is bent in the assembly position between the horizontally arranged cable and the vertically arranged termination.

BRIEF DESCRIPTION OF THE DRAWINGS

Exemplary embodiments of the subject matter of the invention are illustrated in the drawings, in which.

DETAILED DESCRIPTION

Figure 1:
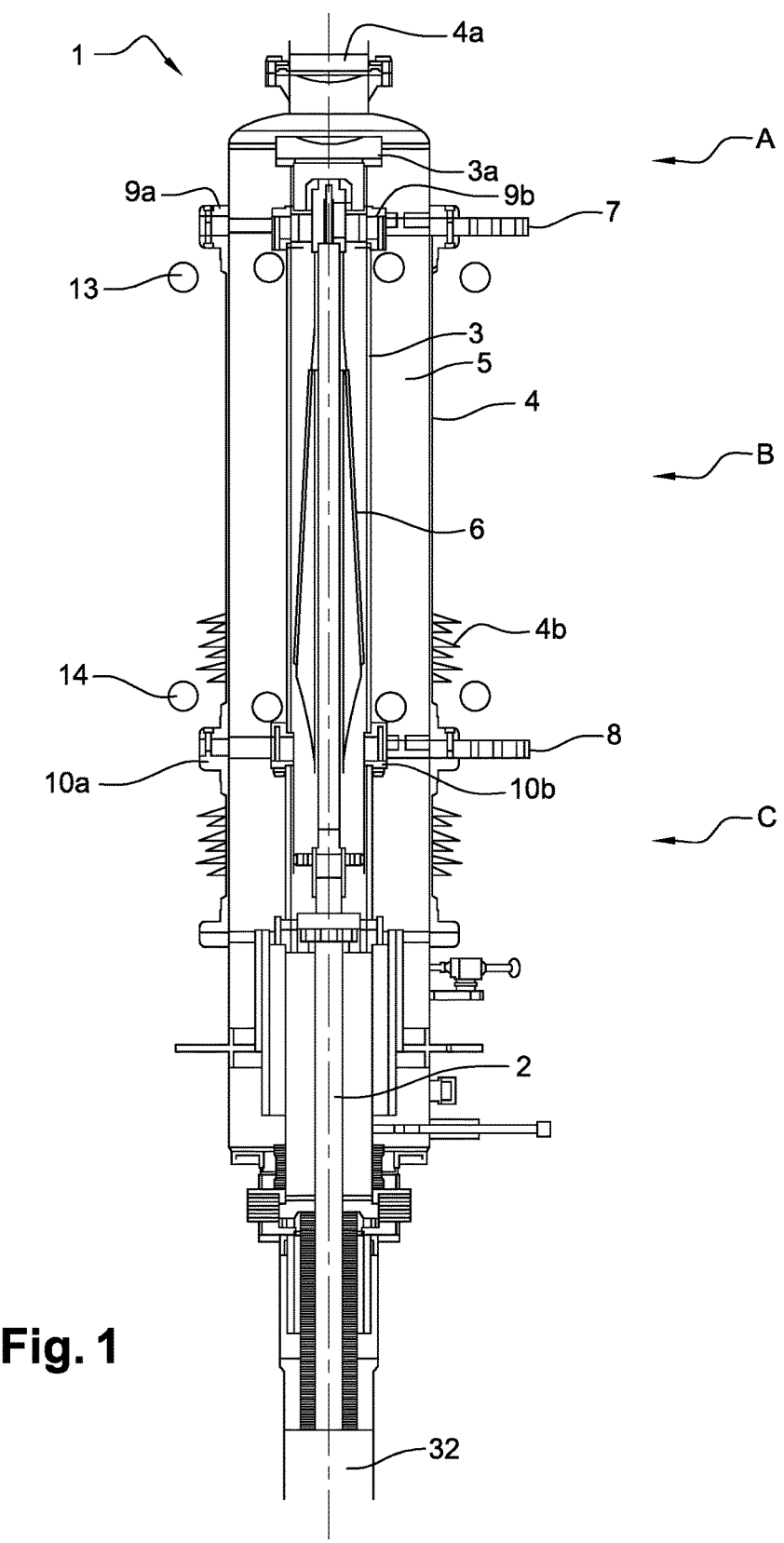
FIG. 1 shows a section through a termination according to one exemplary embodiment of the invention.

In the drawings, identical reference symbols relate to the same technical features.

Figure 2:
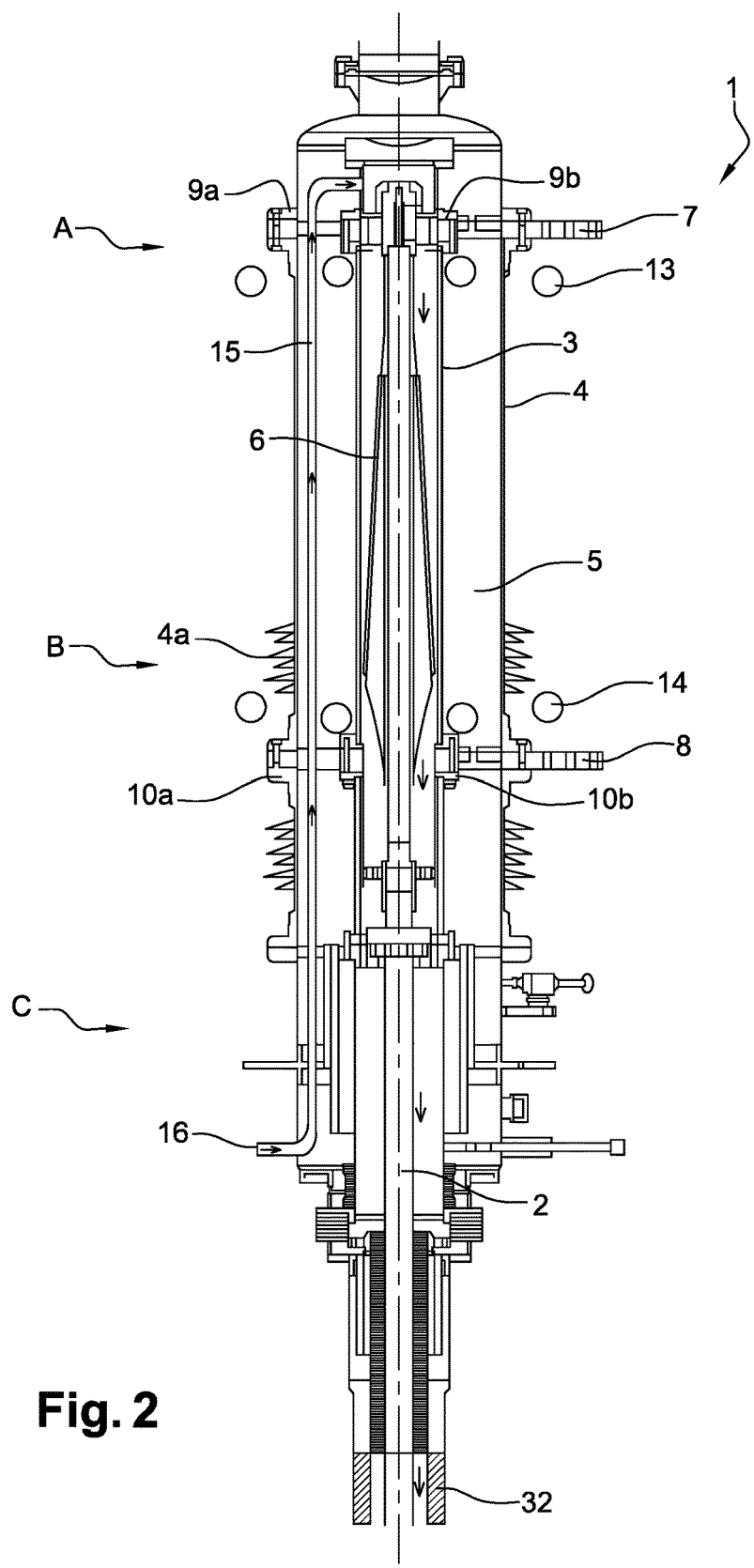
FIG. 2 shows a section through a termination according to a further exemplary embodiment.

FIGS. 1 and 2 show a termination 1 according to embodiments of the invention. The termination 1 is arranged in a vertical manner. The end of a superconducting cable 2 is arranged in the termination 1. The superconducting cable 2 can have one or more, concentrically arranged electrical conductors and also a shielding conductor. In the illustrated examples, the cable 2 has only one electrical conductor and also one shielding conductor. The cable 2 is surrounded by a cable cryostat 32 over the entire transmission section. The end of the cable 2 protrudes beyond the end of the cable cryostat 32.

The conductor of the superconducting cable 2 is connected to an electrical conductor of a bushing 7 which is at high-voltage potential and establishes the electrical connection to the energy supply system (not illustrated) outside the termination 1. A further bushing 8 serves to connect the shielding conductor of the superconducting cable 2 to earth potential. The two bushings 7, 8 are lateral bushings which lead laterally away from the termination 1. As an alternative, the bushing for the high-voltage potential can also lead upwards out of the termination 1.

The termination 1, as illustrated in FIGS. 1 and 2, is composed substantially of an inner sheath 3 and an outer sheath 4 for the most part. The sheaths 3, 4 are each embodied, for example, as rotationally symmetrical pieces of pipe. The inner sheath 3 is composed of electrically insulating material, for example of a composite material such as glass fibre-reinforced plastic (GFRP) or of ceramic. The inner and the outer sheath 3, 4 are each composed of electrically insulating material at least in the region B between the bushings 7, 8. In addition, the sheaths 3, 4 can also be composed of metal in the regions A, C of the termination which are situated above the upper bushing 7 and below the lower bushing 8. The partial pieces of the inner and outer sheath 3, 4 are connected to one another, for example, by means of metal flange connections 9a, 9b, 10a, 10b.

The inner sheath 3 serves to carry the coolant for cooling the cable end and is connected to the cable cryostat, for example by means of a flange connection.

The outer sheath 4 advantageously forms a composite insulator which is composed, for example, of GFRP with silicone ribs 4b which are applied to its outer surface. The outer sheath 4 forms an intermediate space 5, which is filled with thermally insulating material, with the inner sheath 3. The thermal insulation can be composed of insulating foam or glass beads, for example. Furthermore, a negative pressure in relation to the surrounding area can be generated for the purpose of improving the insulating effect in the intermediate space 5.

The cable end which protrudes into the inner sheath 3 is provided with a field control electrode 6 in the illustrated exemplary embodiments. The field control arrangement is necessary to avoid excessive local increases in field strength at the cable end. According to other exemplary embodiments, the field control arrangement can also be implemented as a capacitive field control arrangement which is composed of an arrangement of conductive inserts. The rings which are designated by reference numerals 13 and 14 in FIGS. 1 and 2 indicate shielding arrangements which serve for field control between the metal flanges 9, 10 which are at high-voltage or earth potential.

In the exemplary embodiment according to FIG. 1, the inner sheath 3 is closed off at its upper end by means of a first bursting disc 3a, and the outer sheath 4 is closed off at its upper end by means of a second bursting disc 4a. The bursting discs 3a, 4a are preferably composed of metal, for example of steel. When a prescribed pressure is exceeded at the bursting discs 3a, 4a, the said bursting discs burst and open, without the remaining components of the termination 1 being damaged. The second, outer bursting disc 4a is advantageously designed with a substantially lower response pressure than the inner bursting disc 3a.

The coolant is supplied to the termination 1 by means of a coolant feed. This is illustrated in FIG. 2. The coolant feed is composed of a cooling pipe 15 which conveys the coolant from the lower region C of the termination 1, which region is connected to earth, to the upper region A which is at high-voltage potential. The cooling pipe 15 can be entirely composed of insulating material, or can be composed of insulating material in the region B of the termination 1 and of metal in the regions A and C. At its lower end 16, the cooling pipe is connected to a cooling installation (not illustrated). However, supply to the upper region A can also be carried out in another, expedient manner.

Figure 3A:
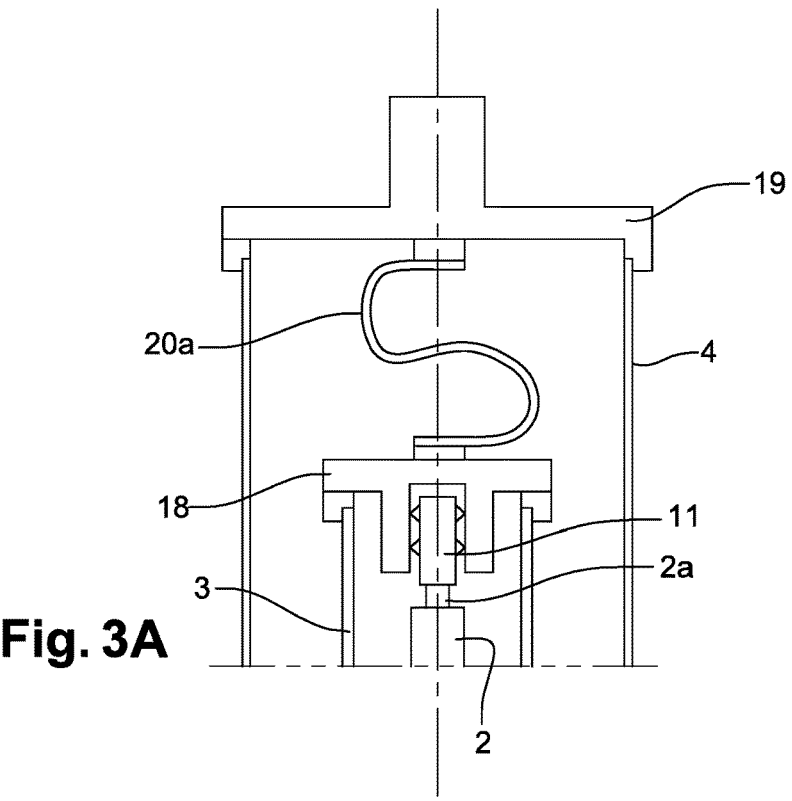
FIGS. 3A and 3B are schematic illustrations of details of two further exemplary embodiments of the termination according to the invention.
Figure 3B:
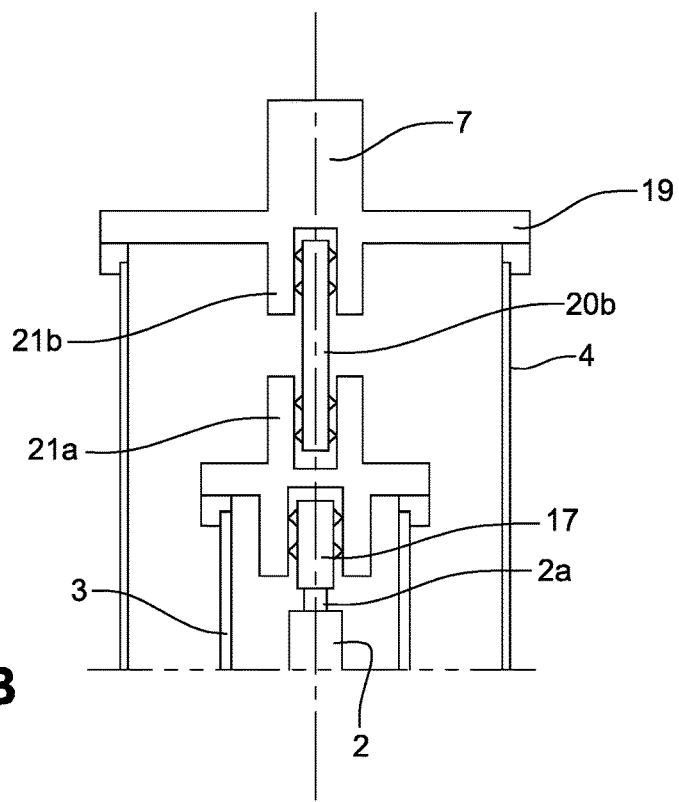

FIGS. 3A and 3B each show upper ends of a termination according to the invention in line with two further embodiments. In principle, the structure of the termination is the same as already described in conjunction with FIGS. 1 and 2. The examples according to FIGS. 3A and 3B differ from the above-described examples in respect of contact-connection to the superconducting cable 2. According to FIGS. 1 and 2, the bushings 7, 8 for contact-connection to a cable are guided laterally out of the termination 1. In the examples described in FIGS. 3A and 3B, the cable end 2 is connected to connecting elements which are guided directly upwards out of the termination. The conductor 2a of the cable 2 is connected to a first, inner terminating plate 18 by means of a plug 17. The inner terminating plate 18 closes the inner sheath 3 at its top end at the same time. The outer sheath 4 is closed by a second, outer terminating plate 19. The outer terminating plate 19 corresponds to a bushing at high-voltage potential. The inner terminating plate 18 and the outer terminating plate 19 are connected to one another by means of a conductive contact element 20a, 20b. The conductive contact element can be, for example, a flexible conductor ribbon 20a, as shown in FIG. 3A. The conductive contact element can also be a second plug 20b which is inserted into each of receptacles 21a, 21b of the two terminating plate 18, 19 which are provided for this purpose, as shown in FIG. 3B.

Figure 4:
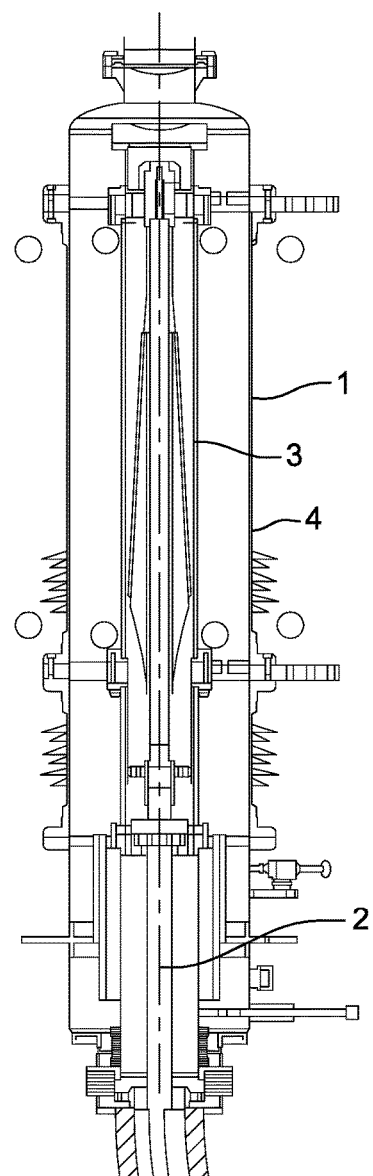
FIG. 4 shows a termination which is constructed in line with the method according to the invention.
Figure 4:
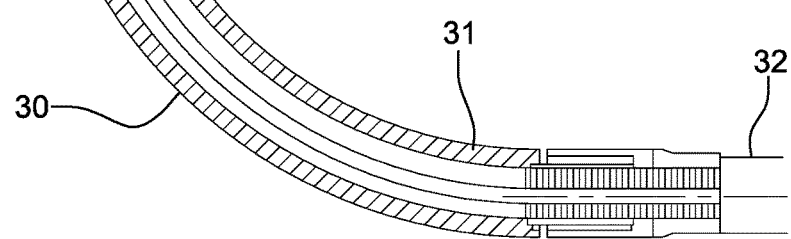

FIG. 4 illustrates a termination 1 which is constructed in line with the method according to the invention. In accordance with the method, a highly flexible cryostat 30 is initially placed over the cable end in the horizontal position. The flexible connecting cryostat 30 according to the invention is composed of two highly flexible pipes which are arranged concentrically in relation to one another and which are separated from one another by a vacuum-insulated gap 31. The pipes are corrugated metal pipes for example. The highly flexible cryostat 30 is connected to the cable cryostat 32. The cable end and the flexible cryostat 30 are then likewise connected to a termination 1, as has been described in conjunction with FIGS. 1 and 2 for example, in the horizontal position. The cable end is then situated in the inner sheath 3 of the termination 1. The termination 1 is then moved to the vertical position in the assembled state, as illustrated in FIG. 4. In the process, the highly flexible cryostat 30 and the cable 2 which is situated therein are bent through approximately 90°. The connecting cryostat 30 is then connected to the inner sheath 3 at one end and to the cable cryostat 32 at the other end. The vacuum chamber 31 of the connecting cryostat 30 is advantageously separated from the intermediate space 5 between the inner sheath 3 and the outer sheath 4 of the termination 1. As a result, the connecting cryostat 30 can be evacuated as early as before installation of the termination 1.

The invention claimed is:

1. Termination for a superconducting cable which is arranged in a tubular cryostat, which serves for carrying a coolant, and has at least one electrical conductor, wherein the termination comprises:
   has an inner sheath, in which one end of the cable is arranged in a coolant, and
   an outer sheath, wherein the sheaths are composed of electrically insulating material and insulating material is arranged in an existing intermediate space between the inner and the outer sheath,
   wherein the inner sheath is connected to the cryostat, and
   wherein the termination is arranged vertically in the assembly position such that a lower part of the inner and outer sheath is connected to earth and an upper part of the inner and outer sheath is connected to high-voltage potential in the operating state,
   wherein, at their respective upper end, the inner sheath is closed off by a first bursting disc and the outer sheath is closed off by a second bursting disc.

2. Termination according to claim 1, wherein the insulating material which is arranged in the intermediate space is composed of a solid.

3. Termination according to claim 1, wherein a negative pressure in relation to atmospheric pressure is generated in the intermediate space.

4. Termination for a superconducting cable which is arranged in a tubular cryostat, which serves for carrying a coolant, and has at least one electrical conductor,
   wherein the termination comprises:
   an inner sheath, in which one end of the cable is arranged in a coolant, and
   an outer sheath,
   wherein the sheaths are composed of electrically insulating material and insulating material is arranged in an existing intermediate space between the inner and the outer sheath,
   wherein the inner sheath is connected to the cryostat, and
   wherein the termination is arranged vertically in the assembly position such that a lower part of the inner and outer sheath is connected to earth and an upper part of the inner and outer sheath is connected to high-voltage potential in the operating state,
   wherein, at their respective upper end, the inner sheath is closed off by an inner terminating plate and the outer sheath is closed off by an outer terminating plate,
   wherein the at least one conductor of the cable is electrically conductively connected to the inner terminating plate and the inner terminating plate is electrically conductively connected to the outer terminating plate.

5. Termination according to claim 4, wherein the at least one conductor of the cable is connected to the inner terminating plate by means of a plug.

6. Termination according to claim 4, wherein the inner terminating plate is connected to the outer terminating plate by means of a plug or by means of a flexible conductor ribbon.

7. Termination according to claim 4, wherein the at least one conductor of the cable end is electrically conductively connected to a first contact element which leads laterally to the outside.

8. Termination according to claim 4, wherein a shielding conductor of the cable end is electrically conductively connected to a second contact element which leads laterally to the outside.

9. Termination according to claim 4, wherein coolant is guided from that part of the termination which is connected to earth, within the said termination, into the part which is at high voltage by means of a cooling pipe which is composed of electrically insulating material.

10. Termination according to claim 9, wherein the cooling pipe runs within the inner sheath and is arranged concentrically in relation to the said inner sheath.

\* \* \* \* \*